US012288280B1

(12) United States Patent
Degtiarev et al.

(10) Patent No.: US 12,288,280 B1
(45) Date of Patent: Apr. 29, 2025

(54) SCENE, POSE, AND ENVIRONMENT REPLACEMENT IN VIDEOS AND IMAGES USING GENERATIVE AI

(71) Applicant: Glam Labs, Inc., San Francisco, CA (US)

(72) Inventors: Roman Degtiarev, Tbilisi (GE); Tikhon Vorobev, Saint Petersburg (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 19/019,564

(22) Filed: Jan. 14, 2025

Related U.S. Application Data

(63) Continuation-in-part of application No. 18/748,397, filed on Jun. 20, 2024, now Pat. No. 12,211,180.

(51) Int. Cl.
*G06T 5/60* (2024.01)
*G06T 5/50* (2006.01)
*G06T 5/70* (2024.01)
*G06T 7/70* (2017.01)
*G06T 11/60* (2006.01)

(52) U.S. Cl.
CPC ............ *G06T 11/60* (2013.01); *G06T 5/50* (2013.01); *G06T 5/60* (2024.01); *G06T 5/70* (2024.01); *G06T 7/70* (2017.01); *G06T 2207/20084* (2013.01); *G06T 2207/30196* (2013.01)

(58) Field of Classification Search
CPC ... G06T 11/60; G06T 5/50; G06T 5/60; G06T 5/70; G06T 7/70; G06T 2207/20084; G06T 2207/30196
See application file for complete search history.

(56) References Cited

U.S. PATENT DOCUMENTS 11,922,550 B1 * 3/2024 Ramesh ............... G06F 40/284
2024/0331322 A1 * 10/2024 Smith .................. G06V 10/945

OTHER PUBLICATIONS

Zhang et al. "Adding Conditional Control to Text-to-Image Diffusion Models", Nov. 26, 2023. (Year: 2023).*

* cited by examiner

*Primary Examiner* — Phuoc Tran
(74) *Attorney, Agent, or Firm* — Georgiy L. Khayet

(57) ABSTRACT

Systems and methods for replacement of scene, pose, and environment in videos and images using generative AI are provided. An example method includes receiving a first image of a face of a person, a second image of a body adopting a pose, and a text including a description of an environment of a scene; encoding the first image into an image embedding; extracting, from the second image, information concerning the pose of the body; encoding the text into a text embedding; randomly generating a noise for the image embedding; combining the noise and the image embedding to obtain a noisy image embedding; providing the noisy image embedding, the text embedding, and the information concerning the pose to a neural network to obtain a second noise; removing the second noise from the noisy image embedding to obtain a denoised image embedding; and decoding the denoised image embedding into an output image.

16 Claims, 8 Drawing Sheets

SCENE, POSE, AND ENVIRONMENT REPLACEMENT IN VIDEOS AND IMAGES USING GENERATIVE AI

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for replacement of scene, pose, and environment in videos and images using generative artificial intelligence (AI).

BACKGROUND

AI-based video and image generation and transformation technologies have become widely adopted and are now integrated into many modern applications across various domains. These applications include video chats, where AI enhances or alters live video feeds in real time, and social networks and online media, where AI-driven filters and effects modify user-generated content. Specifically, these AI-driven filters and effects may change the scene or environment in which a user appears or alter the appearance and features of the person's body, such as modifying facial features, adjusting body proportions, or applying digital makeup and styles.

Despite the significant advancements in AI-based video generation, a persistent challenge for these technologies is the loss of video and image quality and the emergence of unwanted artifacts during video and image generation or transformation. These artifacts may result from the complexities of manipulating video data or the limitations of AI models in accurately capturing fine details. One particularly problematic artifact is the displacement or incorrect placement of a user's body parts, for instance, when arms, hands, or facial features appear distorted, misaligned, or in unnatural positions during generation or transformation processes. Such issues disrupt the immersive experience for viewers, reducing the perceived quality of the videos and images and making the AI-generated content appear less realistic or believable.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for replacement of scene, pose, and environment in videos and images using generative AI is provided. The method includes receiving a first image including an image of a face of a person, receiving a second image including an image of a body adopting a pose, and receiving a text including a description of an environment of a scene. The method includes encoding the first image into an image embedding; extracting, from the second image, information concerning the pose of the body; and encoding the text into a text embedding. The method includes randomly generating a first noise for the image embedding and combining the first noise and the image embedding to obtain a noisy image embedding. The method includes providing the noisy image embedding, the text embedding, and the information concerning the pose to a first neural network to obtain a second noise. The method includes removing the second noise from the noisy image embedding to obtain a denoised image embedding and decoding, using a second neural network, the denoised image embedding into an output image, the output image including the person adopting the pose in the environment of the scene. The method includes replacing, using a transferring model, a further face in the output image with the image of the face of the person.

The information concerning the pose includes the position and an orientation of joints of a human body. The information concerning the pose is extracted using a pretrained deep neural network.

The first neural network includes a U-net neural network. The first neural network is designed to perform at least one spatial transformation of at least one object. At least one parameter of the at least one spatial transformation is partially based on the information concerning the pose of the body.

The method includes, prior to encoding the text into the text embedding, extracting, using a third neural network, at least one feature associated with the person and adding the feature to the text. The feature includes one or more of the following: an ethnicity of the person, a gender of the person, and an age of the person. The environment includes one of the following: an indoor location or an outdoor location.

The method includes, prior to decoding the denoised image embedding, repeating the following steps until the denoised image embedding converges into a further image embedding: providing the denoised image embedding, the text embedding, the information concerning the pose to the first neural network to update the second noise and removing the second noise from the denoised image embedding.

According to another embodiment, a system for replacement of scene, pose, and environment in videos and images using generative AI is provided. The system may include at least one processor and a memory storing processor-executable codes, wherein the processor can be configured to implement the operations of the above-mentioned method for replacement of scene, pose, and environment in videos and images using generative AI.

According to yet another aspect of the disclosure, there is provided a non-transitory processor-readable medium, which stores processor-readable instructions. When the processor-readable instructions are executed by a processor, they cause the processor to implement the above-mentioned method for replacement of scene, pose, and environment in videos and images using generative AI.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
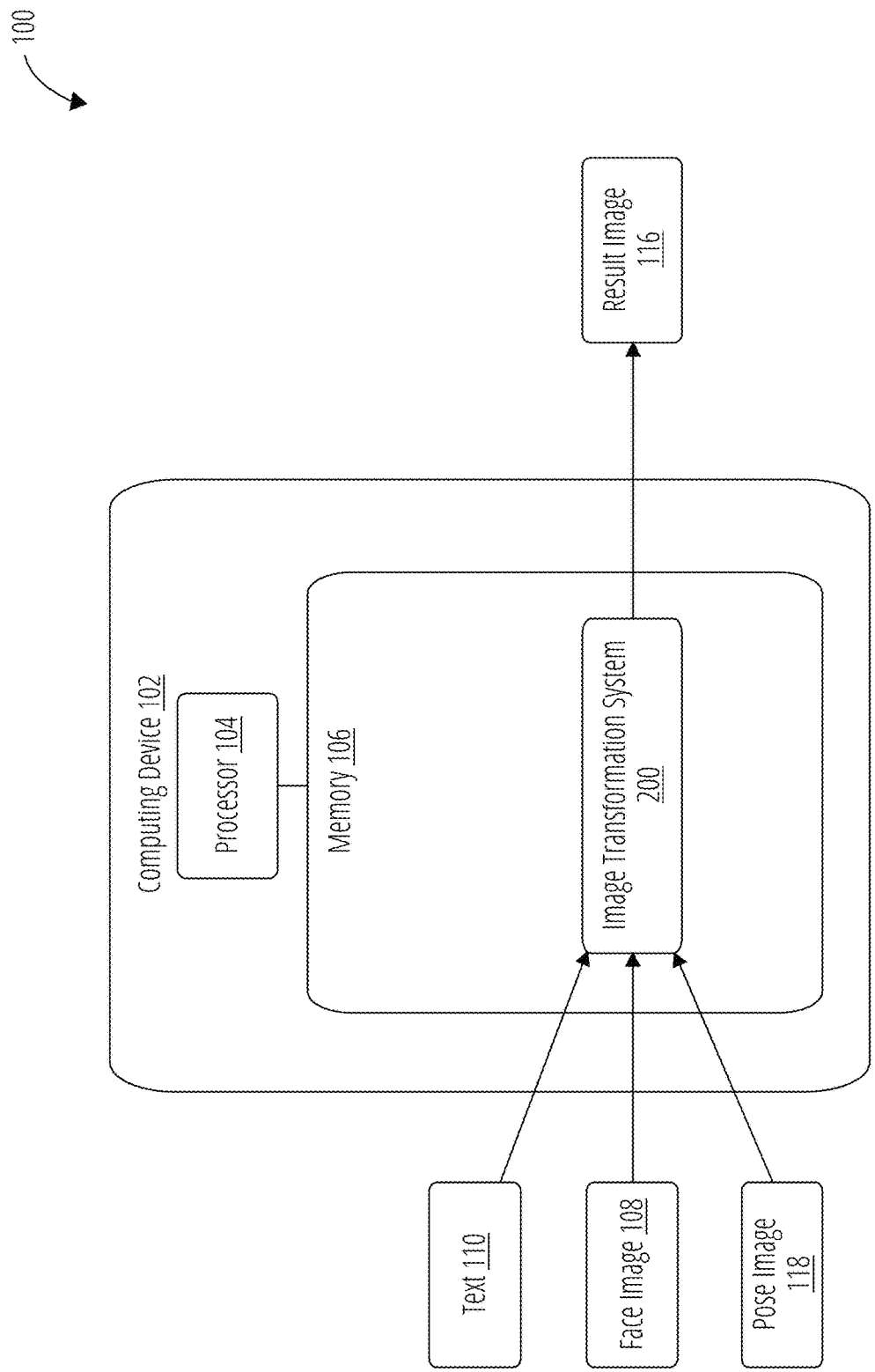
FIG. 1 shows an environment, in which system and methods for adaptive image and video transformation can be implemented, according to an example embodiment of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes methods and systems for replacement of scene, pose, and environment in videos and images using generative AI. Some embodiments of the present disclosure may enable the generation of an image of a user in a new environment and in a specified pose. The environment can be defined by a text description, while the pose can be specified by a reference image (also referred to as a pose image).

In some embodiments, a system receives a face image, a pose image, and a text description. The face image may contain an image of a target person (also referred to as the first person). The pose image may depict the body of another person (or potentially the same person) adopting a specific pose, such as sitting, standing, lying down, or making a particular gesture, and so on. The text description may provide instructions regarding the scene environment in which the target person, adopting the pose from the pose image, should be depicted.

The scene environment may encompass a variety of locations, such as a street, an indoor setting, a park, a beach, a boat, or even inside a car. Notably, this scene environment can differ from those depicted in the original face image and pose image. By combining these inputs, the system may generate a result image where the target person appears in the specified pose and environment, creating a cohesive and realistic output that integrates the provided elements. The system may use one or more classifiers to extract features from the face image and add the features to the text description to obtain an updated text description. These features can be associated with specific characteristics of the person present in the face image, such as the age, the gender, and the ethnicity of the person.

The system may then use a diffusion algorithm to generate the result image based on the face image, the pose image, and the updated text description. Prior to applying the diffusion algorithm, the text description is encoded into text embedding (e.g., using Contrastive Language-Image Pre-Training (CLIP)), and the face image is encoded into image embedding (e.g., using a Variational Autoencoder (VAE) Encoder). The system may also use a model (for example, DWpose) to extract body landmarks from the pose image.

In the diffusion algorithm, random Gaussian noise (initial noise) is added to the image embedding to obtain noisy image embedding. This noisy image embedding is then combined with the text embedding to form a composite embedding. The U-net neural network can predict second noise, which is subtracted from the initial noise to refine the noisy image embedding. This process is iterated multiple times for further refinement of the noisy image embedding.

During the iterations, the pose extracted from the pose image can be preserved with the help of an additional model called ControlNet. ControlNet is a neural network that allows adding the ability to control spatial transformations in large, pre-trained diffusion models. In present embodiments, the control is the human pose, which is set through body landmarks extracted from the pose image. The identity of the person present in the face image can be preserved via an IP Adapter using the text embedding and image embedding. Specifically, the text embedding includes information concerning the age, the gender, and the ethnicity of the person and the image embedding includes face embedding corresponding to the face of the person present in the face image.

Further, the refined noisy image embedding is decoded (e.g., using a VAE) to produce an output image. The output image may include an image of a person resembling the person in the face image, adopting the pose depicted in the pose image, and placed within the scene environment specified in the text description. To enhance fine details of the face in the output image, the system may perform a face swap between the original face image and the output image, replacing the face in the output image with the face from the face image.

Unlike existing solutions, embodiments of the present disclosure allow for the realistic depiction of changes in a person's pose and the transfer of individuals into new scene environments using a photograph of a body adopting a specific pose. Specifically, unlike existing solutions, embodiments of the present disclosure enable changing the pose of a person in an image to a different pose and transferring the person into a new scene environment, while preserving their identity.

Referring now to the drawings, FIG. 1 shows an example environment 100, in which system and methods for adaptive image and video transformation can be implemented. Environment 100 may include a computing device 102 including a processor 104 and a memory 106. Memory 106 may store, as processor-executable instructions, an image transformation system 200.

Computing device 102 may include, but is not limited to, a notebook computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Image transformation system 200 can receive a face image 108, a pose image 118, and a text 110. Image transformation system 200 can generate result image 116 based on the face image 108, pose image 118, and text 110. Face image 108 may include the face of a person. Pose image 118 may include a body adopting a pose. The text 110 may include a description of an environment of a scene, specifying the setting or context in which the person featured in face image 108 is to be transferred and depicted as adopting the pose of the body featured in pose image 118. The environment of the scene can refer to a wide range of settings, such as a bustling city street, a serene park, a cozy indoor cafe, a sandy beach, or a futuristic virtual landscape. For example, the text description might specify "a person sitting on a park bench surrounded by tall trees," "a person standing in an art gallery observing paintings," and so on. These descriptions can guide the system to place the person into a coherent scene that aligns with the pose and setting indicated, creating a visually realistic output. The text 110 may also include instructions concerning modification of the environment of the scene, for example, "generate an image in anime style," "add snow to the background," and so forth. Face image 108, pose image 118, and text 110 can be provided by a user of computing device 102 via a user interface. The result image 116 can feature the person from the face image adopting the pose depicted in pose image 118 and transferred into the environment of the scene described in text 110.

In some embodiments, the image transformation system 200 may process frames of an input video featuring the face of a person, in sequence, to generate frames of an output video. The frames of the input video may be provided to the image transformation system 200 along with pose image 118 and text 110. The frames of the output video may depict the person from the face image adopting the pose shown in the pose image 118 and placed within the environment of the scene described in text 110. Details of image transformation system 200 are described in FIG. 2.

Figure 2:
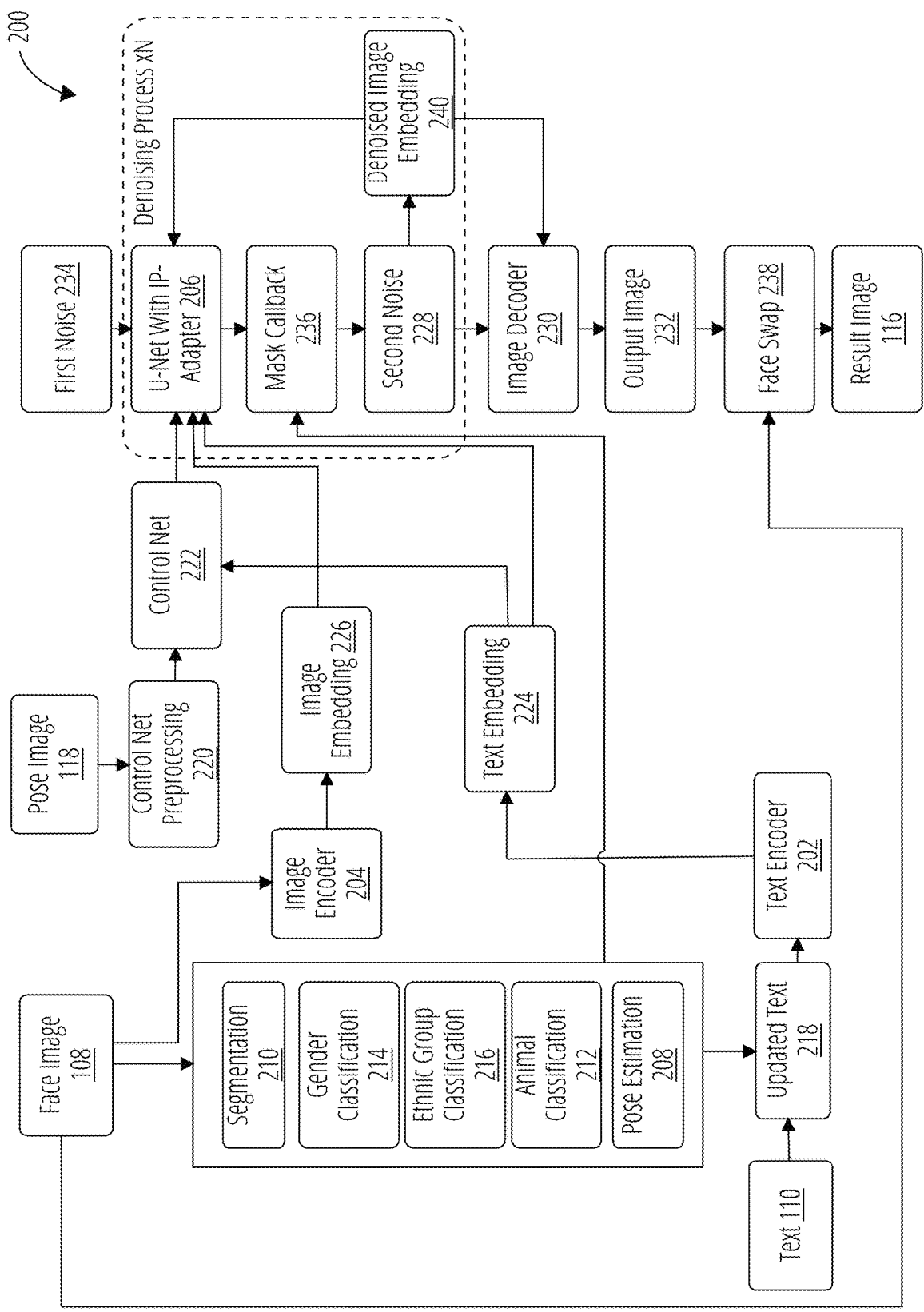
FIG. 2 is a block diagram showing modules of an image transformation system, according to some example embodiments of the present disclosure.

FIG. 2 is a block diagram showing modules of image transformation system 200, according to some example embodiments. The image transformation system 200 may include a text encoder 202, an image encoder 204, a pose estimation 208, a segmentation 210, an animal classification 212, a gender classification 214, an ethnic group classification 216, a control net preprocessing 220, a control net 222, a U-net with IP-adapter 206, an image decoder 230, a mask callback 236, and a face swap 238. In other embodiments, image transformation system 200 may include fewer or more modules than shown in FIG. 2.

Image encoder 204 may receive face image 108 in one of computer readable formats and encode face image 108 into an image embedding 226. The image embedding 226 may refer to a compressed, continuous, and typically lower-dimensional representation of face image 108 in a latent space. In some embodiments, image encoder 204 can be a convolutional neural network (CNN), for example CLIP, or other types of networks designed to extract meaningful features from images.

Segmentation 210 may analyze face image 108 to determine portions of face image 108. The portions can be provided to mask callback 236 to generate masks for the portions. The masks may include a mask for the body of a person in face image 108, a mask of background in face image 108, a mask for the face of the person in face image 108, a mask for hair region of the person in face image 108, and so forth.

Gender classification 214 may analyze face image 108 to determine the gender of a person present in face image 108. Ethnic group classification 216 may analyze face image 108 to determine an ethnic group of the person. Pose estimation 208 (such as DensePose) may predict a pose of the person in face image 108, for example, whether the person is facing away or facing the camera. Image transformation system 200 may include one or more models for detecting further features of the person present in face image 108, such as age, hairstyle, and so forth. Animal classification 212 may analyze face image 108 to determine a type and/or a breed of an animal present in face image 108. In various embodiments, segmentation 210, gender classification 214, ethnic group classification 216, animal classification 212, and pose estimation 208 can be implemented as pretrained neural networks.

The features determined by gender classification 214, ethnic group classification 216, animal classification 212, and pose estimation 208 can be added to text 110 to form an updated text 218. The example features added to the text 110 may include "an African young woman facing the camera," "a Caucasian man facing away from the camera," and so forth. For example, if original text 110 includes "woman portrayed in an anime style" and ethnic group classification 216 determines that face image 108 includes an African woman, then the text 110 can be modified to "an African woman in anime style." Updated text 218 can be provided to text encoder 202.

Text encoder 202 may transform the updated text 218 to a text embedding 224. The text embedding 224 may refer to a numerical representation of a text in a latent space. The latent space of text embedding 224 aligns with the latent space of image embedding 226 generated by the image encoder 204. The text encoder 202 can be CLIP, or other networks designed to transform the text into text embeddings.

Control net preprocessing 220 may analyze pose image 118 to determine an input for control net 222. Specifically, ControlNet control net preprocessing 220 may include the DWpose model. The DWpose model is a deep learning framework specifically designed for pose estimation. Pose estimation involves detecting and identifying the precise positions and orientations of various parts of the human body, such as joints (e.g., elbows, knees, wrists) and limbs (e.g., arms and legs), within images or videos. By analyzing pose image 118, DWpose predicts the spatial arrangement of the body parts of the body present in pose image 118. Thus, input for control net 222 may include body landmarks, for example coordinates of the joints and limbs.

Control net 222 can generate, based on text embedding 224 and the input generated by control net preprocessing 220, a control vector in an internal format readable by U-net with IP-adapter 206. Control net 222 may include a neural network that enables the addition of control over spatial transformations in large, pre-trained diffusion models. In some embodiments, the control pertains to the human pose, which is defined through fixed body landmarks determined by control net preprocessing 220.

Image transformation system 200 can generate a first noise 234 of the same size as the image embedding 226. This first noise 234 typically consists of randomly generated Gaussian noise for a specific portion of image embedding 226 that corresponds to a section of face image 108. The first noise 234 can be injected into the image embedding 226 to obtain noisy image embedding. The noisy image embedding is processed by U-net with IP-adapter 206.

U-net with IP-adapter 206 may include a U-net and an Input Processing Adapter (IP Adapter). U-net may include cross-attention layers to integrate the text embedding 224, image embedding 226, and control vector generated by control net 222. U-net is trained to predict second noise 228. This second noise 228 represents the difference between the noisy image embedding and the denoised approximation that aligns with the true data distribution of image embeddings. This true data distribution approximates the probability distribution of clean image embeddings derived from a set of sample images. IP Adapter can be an additional module or component that modifies how the input data is processed before being fed to the U-net. Combining a U-Net with an IP Adapter allows incorporating additional inputs and control mechanisms to enhance the image processing capabilities of the U-Net. The IP-Adapter can process the image embedding 226 to extract useful information or modify the image embedding 226 to ensure that the U-Net generates correct output.

Mask callback 236 can generate a mask determining how different parts of face image 108 are processed. Specifically, mask callback 236 creates a mask that defines to what extent to process and change different parts of face image 108 (for example, faces, facial features, foreground, and background). Accordingly in some embodiments, image transformation system 200 can generate different first noise 234 (and correspondingly, second noise 228) for various portions of face image 108, allowing specific regions to be modified differently. This targeted approach ensures that some areas of face image 108 are altered less or more than others, enabling the application of different styles to specific sections based, for example, on the prompts provided in text 110. The first noise 234 can be injected only into the part of image embedding 226 that corresponds to a region of face image 108 defined by the mask.

The image transformation system 200 may utilize second noise 228 to obtain a denoised image embedding 240 by applying a linear transformation to the noisy image embedding. The denoised image embedding 240 can then be processed by U-net with IP-adapter 206 to update second noise 228, which in turn can be used to update the denoised image embedding 240. This iterative process of predicting second noise 228 and updating denoised image embedding 240 can be repeated several times (e.g., five) until the denoised image embedding 240 converges to an image embedding belonging to the true data distribution of embedding corresponding to images. Thus, the iterative process progressively aligns the denoised image embedding 240 with the desired data distribution and achieves high-quality stylization.

After the iterative denoising steps, the denoised image embedding 240 can be provided to image decoder 230. The image decoder 230, which may include a VAE decoder, processes the refined denoised image embedding 240 to reconstruct an output image 232 that aligns with the stylistic instructions in text 110 while preserving the key features of the original image (age, gender, ethnicity of the person in face image). Because control net 222 controls spatial transformation in U-net with IP-adapter 206, the person in output image 232 may adopt the pose of the body present in the pose image 118.

The output image 232 may include a face that lacks fine details of the face of person present in face image 108. To improve fine details of the face, the output image 232 and face image 108 can be provided to face swap 238. The face swap 238 may include a deep learning network pretrained to transfer the face of the person in face image 108 onto the face in output image 232, thereby to generate result image 116.

Figure 3:
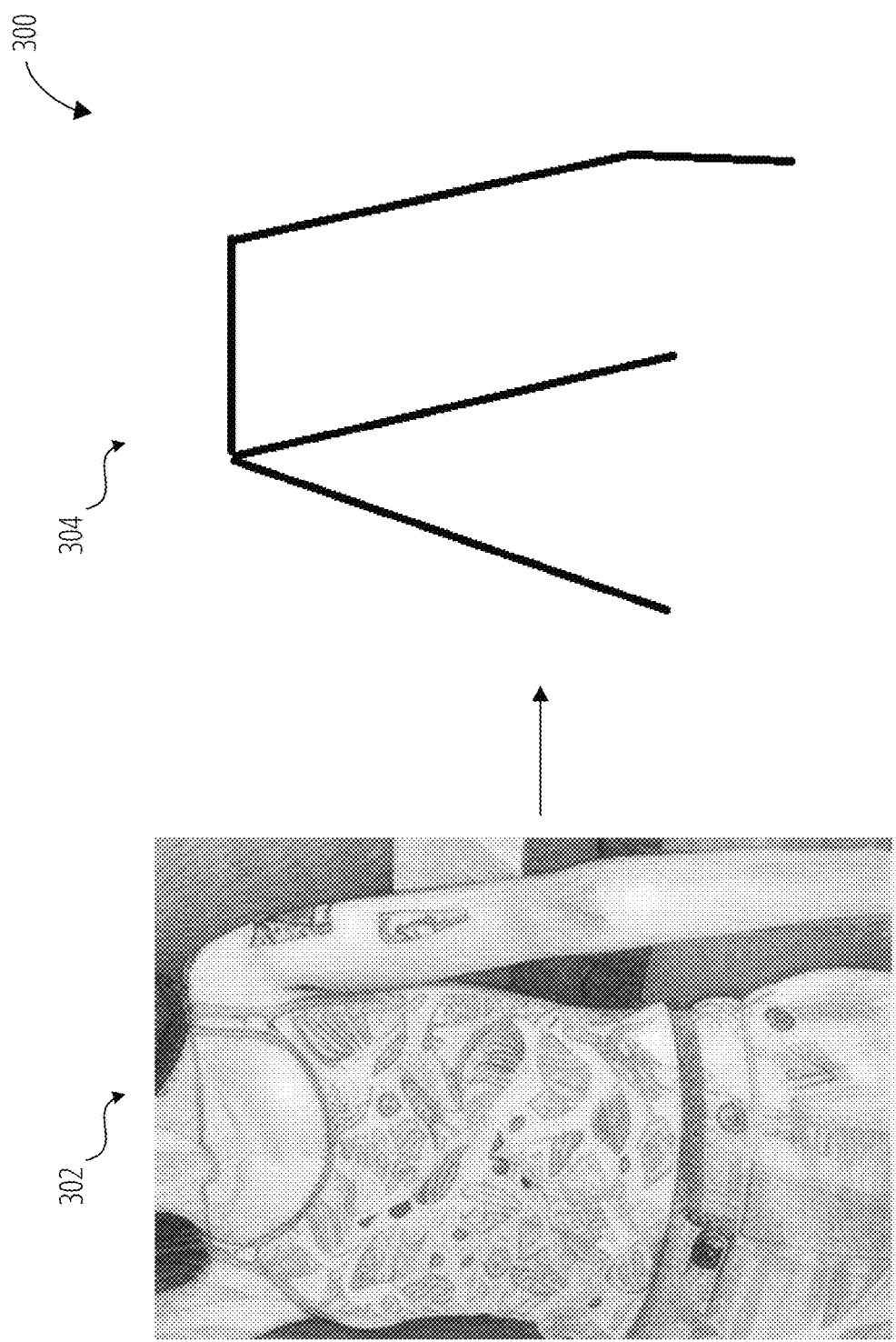
FIG. 3 is a schematic showing an example image and a skeleton corresponding to the image, according to an example embodiment of the present disclosure.

FIG. 3 is a schematic 300 showing an example image 302 and corresponding skeleton 304. Pose estimation 208 (shown in FIG. 2) may include a neural network that generates skeleton 304 from image 302. Points in skeleton 304 can be assigned colors indicating a coordinate of the points in a horizontal direction from the point of view of the camera. In some embodiments, the skeleton 304 can be generated by a DensePose.

Pose estimation 208 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text 110 includes "woman in anime style," then the text 110 can be modified to "woman in anime style facing front."

Figure 4:
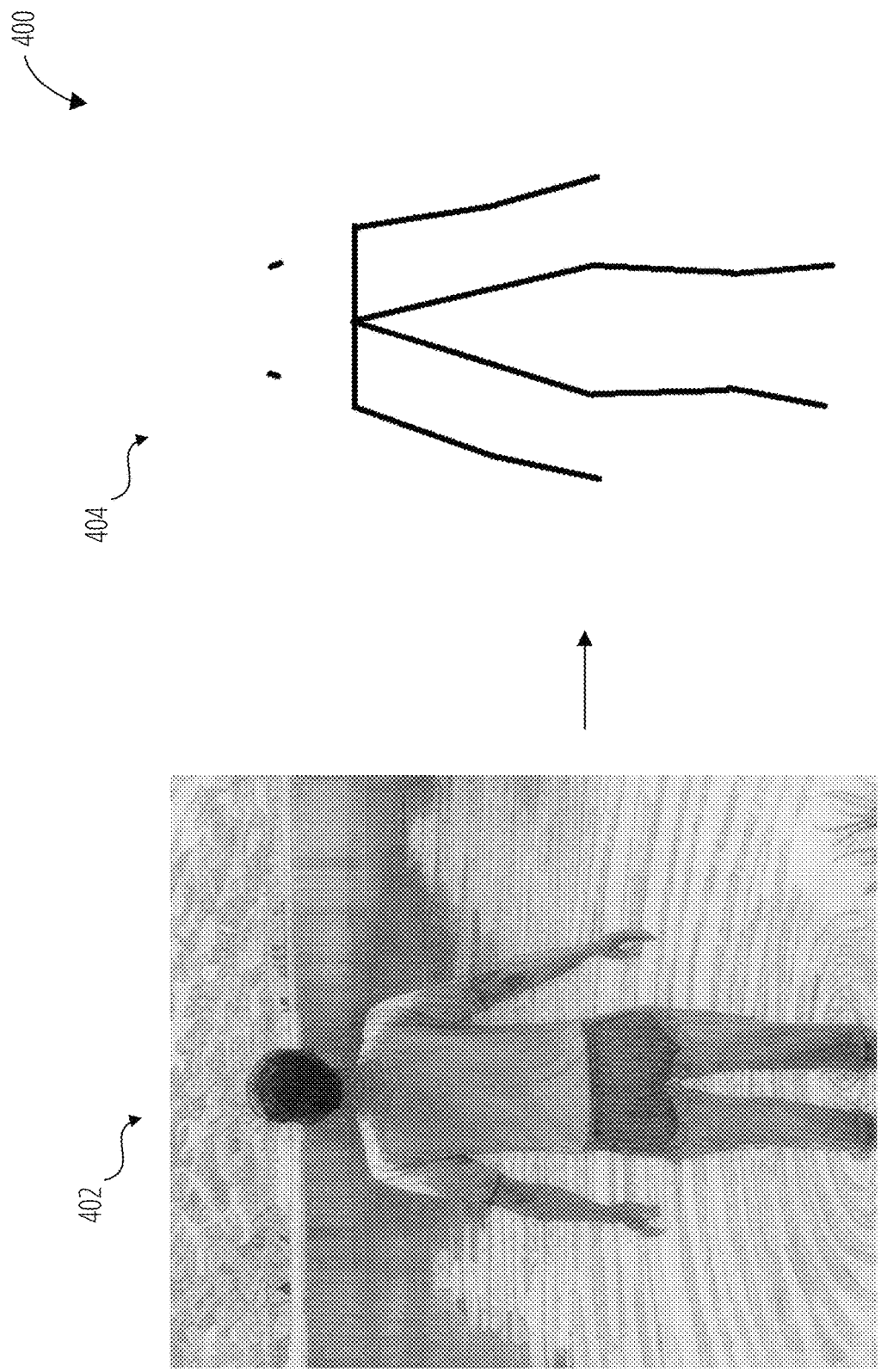
FIG. 4 is a schematic showing an example image and a skeleton corresponding to the image, according to an example embodiment of the present disclosure.

FIG. 4 is a schematic 400 showing an example image 402 and corresponding skeleton 404. In image 402, a person is shown in full length. In corresponding skeleton 404, the left shoulder and the right shoulder have the same coordinate in the horizontal direction from the point of view of the camera. However, the coordinate of the right hip is smaller than the coordinate of the left hip. It means that the person is facing backwards. Accordingly, if original text 110 includes "a man in anime style," then the text 110 can be modified to "body of a man in anime style viewed from behind."

Figure 5:
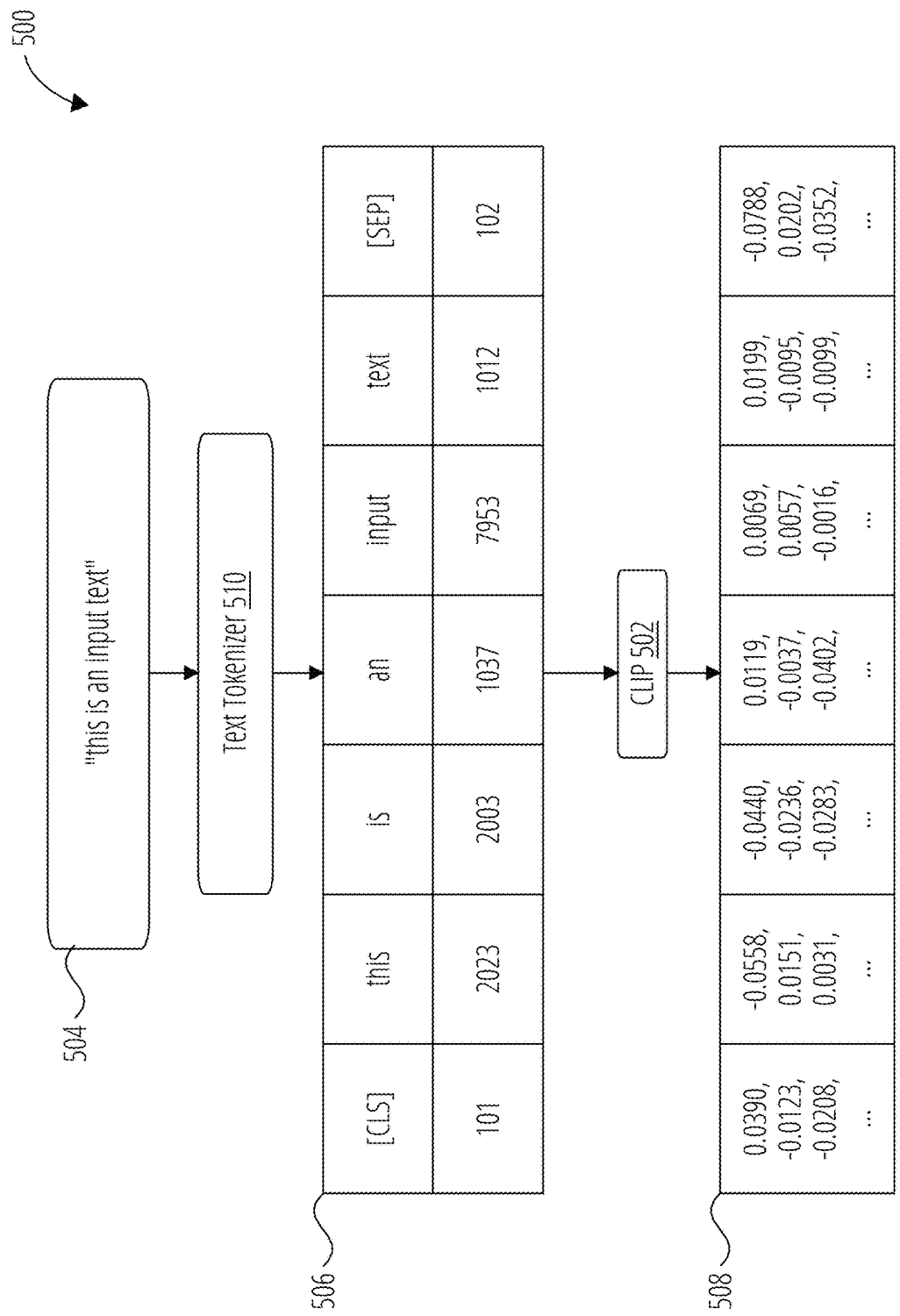
FIG. 5 is a block diagram showing details of a text encoder, according to an example embodiment of the present disclosure.

FIG. 5 is a block diagram 500 showing details of converting text into text embedding, which aligns with a latent space (shown in FIG. 2), according to an example embodiment. In the example of FIG. 5, CLIP 502 is used as text encoder 202 shown in FIG. 2. Text tokenizer 510 may generate text tokens 506 from raw text 504 (for example, text 110). Then text tokens 506 can be provided to CLIP 502 to generate text embeddings 508, which aligns with the latent spaces.

Figure 6:
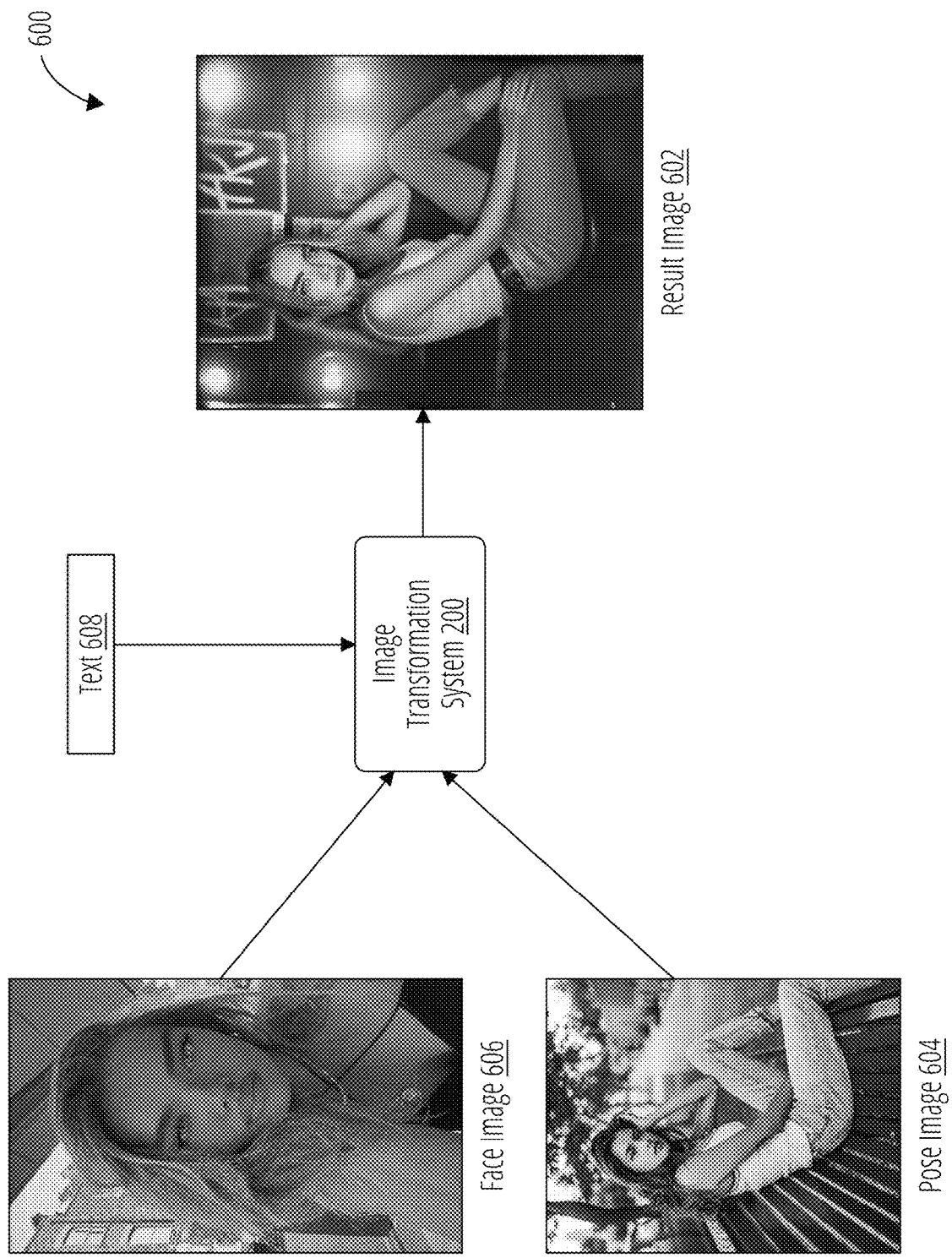
FIG. 6 is a schematic showing an example result image generated from a face image, a pose image, and text by the image transformation system 200.

FIG. 6 is a schematic 600 showing an example result image 602 generated from a face image 606, a pose image 604, and text 608 by the image transformation system 200. In the example of FIG. 6, face image 606 depicts the face of a first person. The pose image 604 depicts a second person adopting a seated pose on a bench on a street. The text 608 may include a description of a scene environment, for example, "a girl in a cozy cafe." The image transformation system 200 processes face image 606, pose image 604, and the text 608 as described in FIG. 2 to generate the result image 602. As result, the result image 602 depicts the first person from the face image 606 adopting the pose of the second person in the pose image 604 within a cafe as indicated by the text 608.

Figure 7:
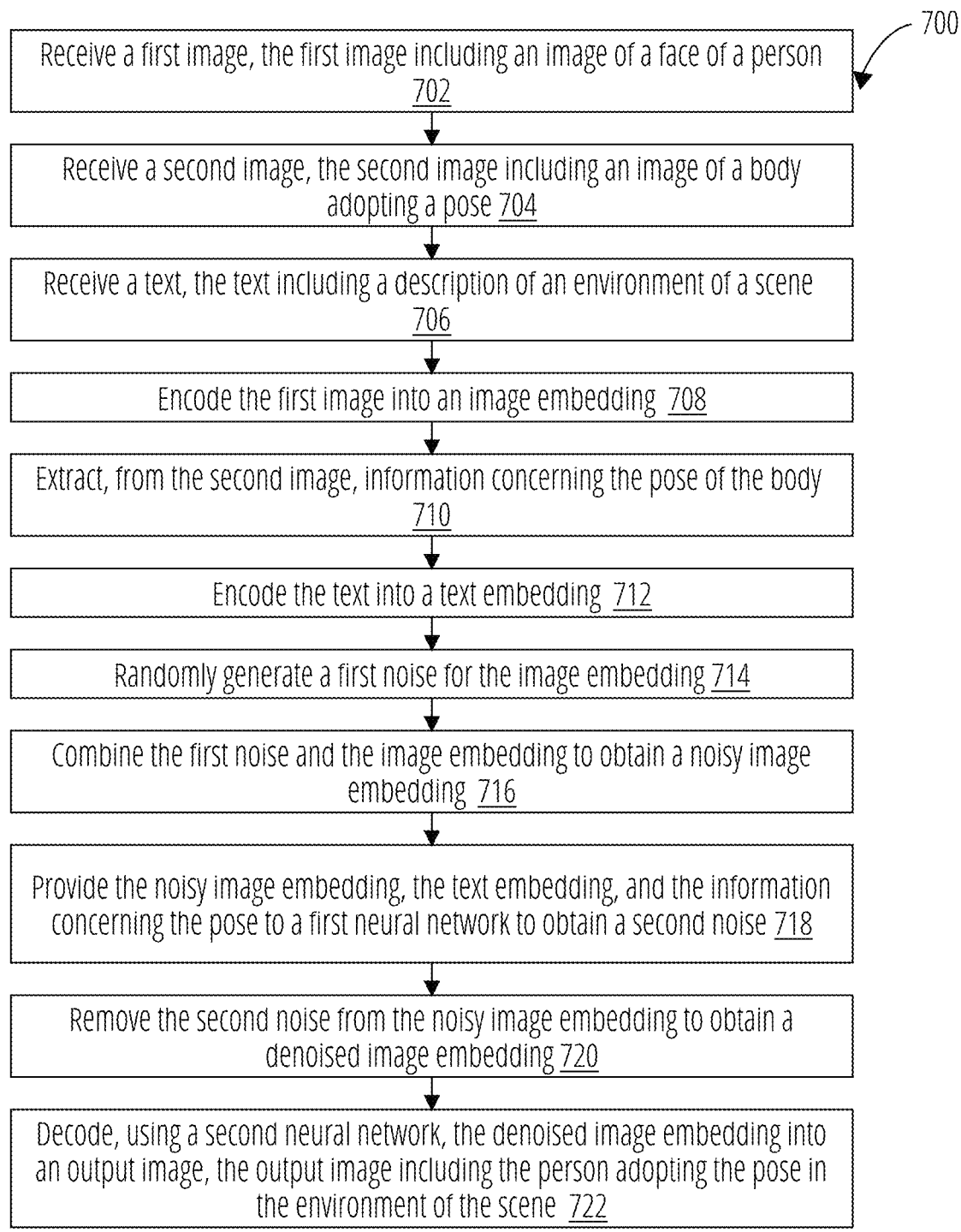
FIG. 7 is a flow chart showing a method 700 for replacement of scene, pose, and environment in videos and images using generative AI as have been described, according to an example embodiment.

FIG. 7 is a flow chart showing a method 700 for replacement of scene, pose, and environment in videos and images using generative AI have been described, according to an example embodiment. In some embodiments, the operations of the method 700 may be combined, performed in parallel, or performed in a different order. The method 700 may also include additional or fewer operations than those illustrated. The method 700 may be performed by processing logic that comprises hardware (e.g., decision making logic, dedicated logic, programmable logic, and microcode), software (such as software run on a general-purpose computer system or a dedicated machine), or a combination of both.

In block 702, method 700 may include receiving a first image. The first image may include an image of a face of a person. In block 704, method 700 may include receiving a second image. The second image may include an image of a body adopting a pose.

In block 706, method 700 may include receiving a text. The text may include a description of an environment of a scene. The environment may include one of the following: an indoor location or an outdoor location.

In block 708, method 700 may include encoding the first image into an image embedding. In block 710, method 700 may include extracting, from the second image, information concerning the pose of the body. The information concerning the pose includes the position and an orientation of joints of a human body. The information concerning the pose is extracted using a pretrained deep neural network.

In block 712, method 700 may include encoding the text into a text embedding. The method may include, prior to encoding the text into the text embedding, extracting, using a pretrained neural network, at least one feature associated with the person and adding the feature to the text. The feature may include one or more of the following: the ethnicity of the person, the gender of the person, and an age of the person.

In block 714, method 700 may include randomly generating a first noise for the image embedding. In block 716, method 700 may include combining the first noise and the image embedding to obtain a noisy image embedding.

In block 718, method 700 may include providing the noisy image embedding, the text embedding, and the information concerning the pose to a first neural network to obtain a second noise. The first neural network can be designed to perform at least one spatial transformation of at least one object. At least one parameter of the spatial transformation can be partially based on the information concerning the pose of the body.

In block 720, method 700 may include removing the second noise from the noisy image embedding to obtain a denoised image embedding. The method 700 may include repeating the following steps until the denoised image embedding converges into a further image embedding: providing the denoised image embedding, the text embedding, and the information concerning the pose to the first neural network to update the second noise and removing the second noise from the denoised image embedding. The first neural network may include a U-net neural network.

In block 722, method 700 may include decoding, using a second neural network, the denoised image embedding into an output image, the output image including the person adopting the pose in the environment of the scene.

The method 700 may further include replacing, using a transferring model, a further face in the output image with the image of the face of the person.

Figure 8:
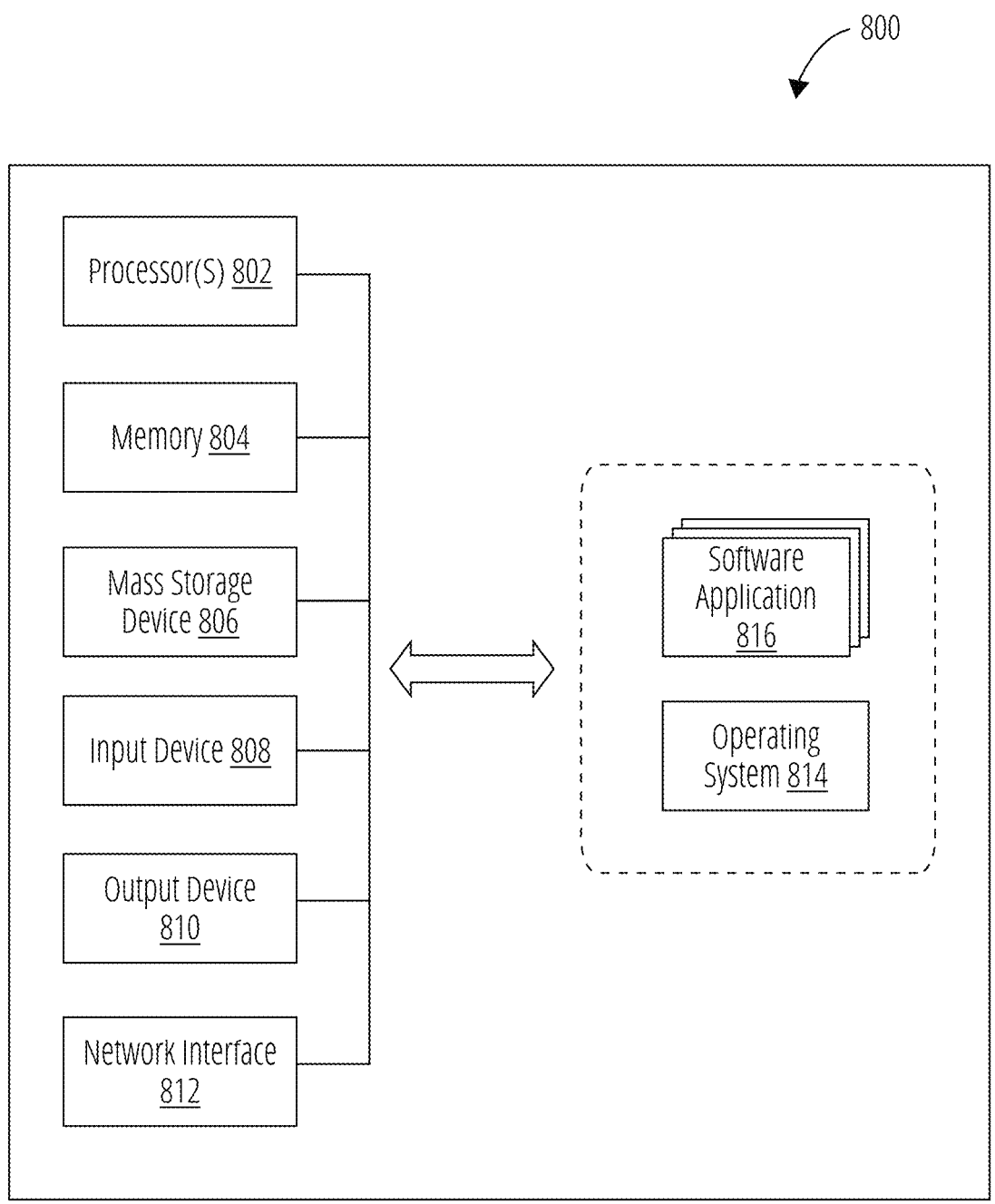
FIG. 8 is a high-level block diagram illustrating an example computer system, within which a set of instructions for causing the machine to perform any one or more of the methodologies discussed herein can be executed.

FIG. 8 is a high-level block diagram illustrating an example computer system 800, within which a set of instructions for causing the machine to perform any one or more of the methodologies discussed herein can be executed. The computer system 800 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 800 is an example of computing device 102 shown in FIG. 1. Notably, FIG. 8 illustrates just one example of the computer system 800 and, in some embodiments, the computer system 800 may have fewer elements/modules than shown in FIG. 8 or more elements/modules than shown in FIG. 8.

The computer system 800 may include one or more processor(s) 802, a memory 804, one or more mass storage devices 806, one or more input devices 808, one or more output devices 810, and a network interface 812. The processor(s) 802 are, in some examples, configured to implement functionality and/or process instructions for execution within the computer system 800. For example, the processor(s) 802 may process instructions stored in memory 804 and/or instructions stored on the mass storage devices 806. Such instructions may include components of an operating system 814 or software applications 816. The computer system 800 may also include one or more additional components not shown in FIG. 8, such as a body, a power supply, a power supply, a global positioning system (GPS) receiver, and so forth.

The memory 804, according to one example, is configured to store information within the computer system 800 during operation. The memory 804, in some example embodiments, may refer to a non-transitory computer-readable storage medium or a computer-readable storage device. In some examples, the memory 804 is a temporary memory, meaning that a primary purpose of the memory 804 may not be long-term storage. The memory 804 may also refer to a volatile memory, meaning that the memory 804 does not maintain stored contents when the memory 804 is not receiving power. Examples of volatile memories include random access memories (RAM), dynamic random access memories (DRAM), static random access memories (SRAM), and other forms of volatile memories known in the art. In some examples, the memory 804 is used to store program instructions for execution by the processor(s) 802. The memory 804, in one example, is used by software (e.g., the operating system 814 or the software applications 816). Generally, the software applications 816 refer to software Applications suitable for implementing at least some operations of the methods for replacement of scene, pose, and environment in videos and images using generative AI as described herein.

The mass storage devices 806 may include one or more transitory or non-transitory computer-readable storage media and/or computer-readable storage devices. In some embodiments, the mass storage devices 806 may be configured to store greater amounts of information than the memory 804. The mass storage devices 806 may further be configured for long-term storage of information. In some examples, the mass storage devices 806 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 808, in some examples, may be configured to receive input from a user through tactile, audio, video, or biometric channels. Examples of the input devices 808 may include a keyboard, a keypad, a mouse, a trackball, a touchscreen, a touchpad, a microphone, one or more video cameras, image sensors, fingerprint sensors, or any other device capable of detecting input from a user or other source, and relaying the input to the computer system 800, or components thereof.

The output devices 810, in some examples, may be configured to provide output to a user through visual or auditory channels. The output devices 810 may include a video graphics adapter card, a liquid crystal display (LCD) monitor, a light emitting diode (LED) monitor, an organic LED monitor, a sound card, a speaker, a lighting device, an LED, a projector, or any other device capable of generating output that may be intelligible to a user. The output devices 810 may also include a touchscreen, a presence-sensitive display, or other input/output capable displays known in the art.

The network interface 812 of the computer system 800, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 812 may be a network interface card, such as an Ethernet card, an optical transceiver, a radio frequency transceiver, or any other type of device that can send and receive information.

The operating system 814 may control one or more functionalities of the computer system 800 and/or components thereof. For example, the operating system 814 may interact with the software applications 816 and may facilitate one or more interactions between the software applications 816 and components of the computer system 800. As shown in FIG. 8, the operating system 814 may interact with or be otherwise coupled to the software applications 816 and components thereof. In some embodiments, the software applications 816 may be included in the operating system 814. In these and other examples, virtual modules, firmware, or software may be part of the software applications 816.

Thus, systems and methods for replacement of scene, pose, and environment in videos and images using generative AI have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
receiving a first image, the first image including an image of a face of a person;
receiving a second image, the second image including an image of a body adopting a pose;
receiving a text, the text including a description of an environment of a scene;
encoding the first image into an image embedding;
extracting, from the second image, information concerning the pose of the body;
extracting, from the first image, using a pretrained neural network, at least one feature associated with the person, the at least one feature including one or more of the following: an ethnicity of the person, a gender of the person, and an orientation of the person with respect to a plane of the first image;
adding the at least one feature to the text to obtain an updated text;
encoding the updated text into a text embedding;
randomly generating a first noise for the image embedding;
combining the first noise and the image embedding to obtain a noisy image embedding;
providing the noisy image embedding, the text embedding, and the information concerning the pose to a first neural network to obtain a second noise;
removing the second noise from the noisy image embedding to obtain a denoised image embedding; and
decoding, using a second neural network, the denoised image embedding into an output image, the output image including the person adopting the pose in the environment of the scene.

2. The method of claim 1, further comprising replacing, using a transferring model, a further face in the output image with the image of the face of the person.

3. The method of claim 1, wherein the information concerning the pose includes a position and an orientation of joints of a human body.

4. The method of claim 1, wherein the information concerning the pose is extracted using a pretrained deep neural network.

5. The method of claim 1, wherein:
the first neural network is designed to perform at least one spatial transformation of at least one object; and
at least one parameter of the at least one spatial transformation is partially based on the information concerning the pose of the body.

6. The method of claim 1, wherein the environment includes one of the following: an indoor location or an outdoor location.

7. The method of claim 1, further comprising, prior to decoding the denoised image embedding, repeating the following steps until the denoised image embedding converges into a further image embedding:
providing the denoised image embedding, the text embedding, and the information concerning the pose to the first neural network to update the second noise; and
removing the second noise from the denoised image embedding.

8. The method of claim 1, wherein the first neural network includes a U-net neural network.

9. A computing device comprising:
a processor; and
a memory storing instructions that, when executed by the processor, configure the computing device to:
- receive a first image, the first image including an image of a face of a person;
- receive a second image, the second image including an image of a body adopting a pose;
- receive a text, the text including a description of an environment of a scene;
encode the first image into an image embedding;
extract, from the second image, information concerning the pose of the body;
extract, from the first image, using a pretrained neural network, at least one feature associated with the person, the at least one feature including one or more of the following: an ethnicity of the person, a gender of the person, and an orientation of the person with respect to a plane of the first image;
add the at least one feature to the text to obtain an updated text;
encode the updated text into a text embedding;
randomly generate a first noise for the image embedding;
combine the first noise and the image embedding to obtain a noisy image embedding;
provide the noisy image embedding, the text embedding, and the information concerning the pose to a first neural network to obtain a second noise;
remove the second noise from the noisy image embedding to obtain a denoised image embedding; and
decode, using a second neural network, the denoised image embedding into an output image, the output image including the person adopting the pose in the environment of the scene.

10. The computing device of claim 9, wherein the instructions further configure the computing device to replace, using a transferring model, a further face in the output image with the image of the face of the person.

11. The computing device of claim 9, wherein the information concerning the pose includes a position and an orientation of joints of a human body.

12. The computing device of claim 9, wherein the information concerning the pose is extracted using a pretrained deep neural network.

13. The computing device of claim 9, wherein:
the first neural network is designed to perform at least one spatial transformation of at least one object; and
at least one parameter of the at least one spatial transformation is partially based on the information concern the pose of the body.

14. The computing device of claim 9, wherein the environment includes one of the following: an indoor location or an outdoor location.

15. The computing device of claim 9, wherein the instructions further configure the computing device to, prior to decoding the denoised image embedding, repeating the following steps until the denoised image embedding converges into a further image embedding:
- provide the denoised image embedding, the text embedding, and the information concerning the pose to the first neural network to update the second noise; and
- remove the second noise from the denoised image embedding.

16. A non-transitory computer-readable storage medium, the computer-readable storage medium including instructions that, when executed by a computing device, cause the computing device to:
- receive a first image, the first image including an image of a face of a person;
- receive a second image, the second image including an image of a body adopting a pose;
- receive a text, the text including a description of an environment of a scene;
encode the first image into an image embedding;
extract, from the second image, information concerning the pose of the body;
extract, from the first image, using a pretrained neural network, at least one feature associated with the person, the at least one feature including one or more of the following: an ethnicity of the person, a gender of the person, and an orientation of the person with respect to a plane of the first image;
add the at least one feature to the text to obtain an updated text;
encode the updated text into a text embedding;
randomly generate a first noise for the image embedding;
combine the first noise and the image embedding to obtain a noisy image embedding;
provide the noisy image embedding, the text embedding, and the information concerning the pose to a first neural network to obtain a second noise;
remove the second noise from the noisy image embedding to obtain a denoised image embedding; and
decode, using a second neural network, the denoised image embedding into an output image, the output image including the person adopting the pose in the environment of the scene.

* * * * *